United States Patent

[11] 3,540,760

| [72] | Inventors | Paul J. Miller<br>Richmond Heights;<br>Karl K. Chen, Cleveland Heights; James R. Jeromson, Jr., Willoughby, Ohio; Ellis M. Wellman, Erie, Pennsylvania |
|---|---|---|
| [21] | Appl. No. | 809,635 |
| [22] | Filed | March 24, 1969 |
| [45] | Patented | Nov. 17, 1970 |
| [73] | Assignee | The Weatherhead Company<br>a corporation of Ohio |

[54] QUICK CONNECT COUPLING
7 Claims, 3 Drawing Figs.

[52] U.S. Cl. .................................................. 285/321,
285/354
[51] Int. Cl. ..................................................... F16l 39/00
[50] Field of Search ........................................ 285/13, 14,
153, 321, vent, 354, 305; 137/583

[56] References Cited
UNITED STATES PATENTS
| 1,369,687 | 2/1921 | Martin...................... | 285/321X |
| 2,914,344 | 11/1959 | Anthes...................... | 285/321X |
| 3,361,453 | 1/1968 | Brown et al................. | 285/321 |
| 3,453,005 | 7/1969 | Foults......................... | 285/321X |

FOREIGN PATENTS
| 1,396,434 | 3/1965 | France ........................ | 285/305 |

*Primary Examiner*—Dave W. Arola
*Attorney*—McNenny, Farrington, Pearne & Gordon ABSTRACT: A quick connect coupling for fluid lines comprises a tubular female member providing an internal cylindrical surface for sealing engagement with a resilient O-ring carried in an external annular groove in the leading end of a tubular male member. An internal conical transition zone leading to the cylindrical sealing surface guides the entering lead end of the male member and assures uniform sealing of the O-ring. The male member provides a conical portion adapted to expand an elliptical retaining ring secured to the female member when it is inserted into the female member. The elliptical spring engages a second groove on the male member to lock the members together. The members may be uncoupled by unthreading a shell that engages the outside surface of the female member and retains the elliptical spring. The coupling elements are proportioned to permit the coupling to be unsealed before it is completely disconnected.

Patented Nov. 17, 1970
3,540,760
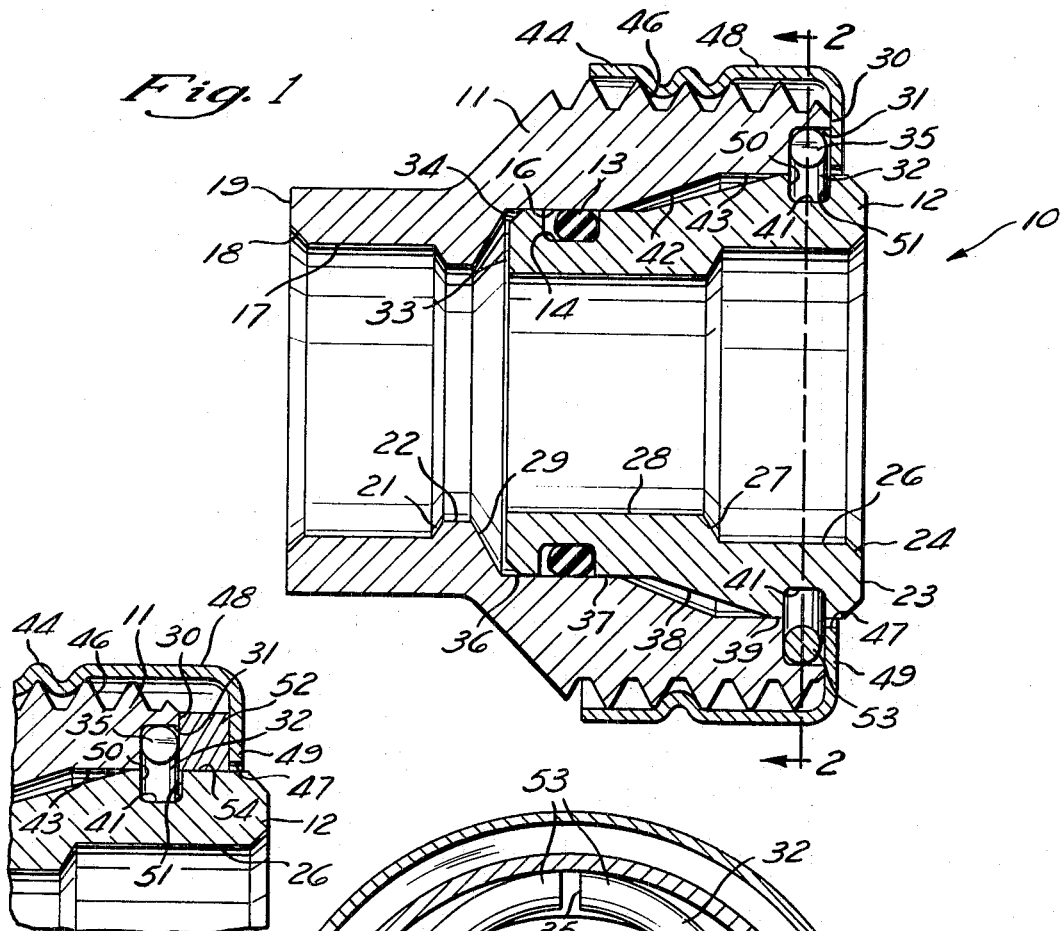
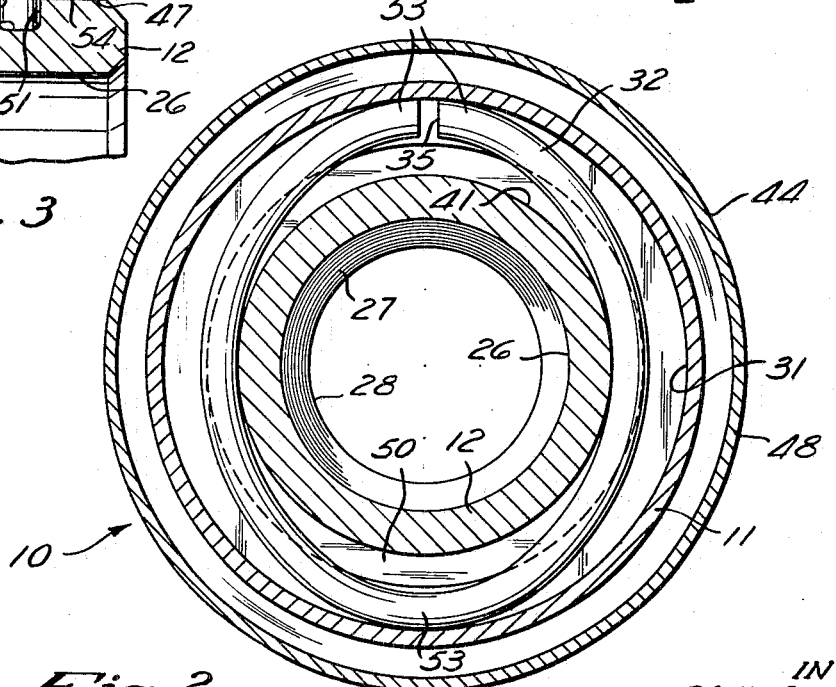
INVENTORS
PAUL J. MILLER,
KARL K. CHEN,
JAMES R. JEROMSON, JR.
& ELLIS M. WELLMAN
BY
M$^{c}$NENNY, FARRINGTON, PEARNE & GORDON
ATTORNEYS

QUICK CONNECT COUPLING

BACKGROUND OF THE INVENTION

This invention relates to a coupling for joining high pressure fluid lines and, more particularly, to a quick connect coupling assembly.

A coupling assembly embodying this invention has immediate use in air-conditioning systems as found in today's automobiles. This and other high-volume applications demand that a coupling not only make an effectively sealed joint between hoses or tubes, but also that such a coupling may be connected with a minimum of effort. Ease of assembly reduces overall costs by reducing system installation time. At the same time, of course, manufacturing economy is still of prime importance in a mass-produced coupling.

While the provision of a quick connecting coupling is desirable, the provision of a coupling which may be quickly disconnected is not necessarily advantageous. It is more desirable to provide a means whereby high pressure which has been trapped in a charged system may be vented in a controllable fashion. A coupling that may be quickly disconnected might suddenly release such pressure when an attempt is made to disconnect the coupling.

SUMMARY OF THE INVENTION

This invention provides a quick connect coupling which may be connected without the use of tools or other equipment. Moreover, loose and separate parts have been eliminated to minimize assembly time. To complete a connection, all that is required is the simple insertion of one coupling member into the other. Since no extraneous mechanical motions, such as threading one member onto another, are required, assembly time is reduced to a minimum. Further, the chances of an improper installation are reduced, since the degree of skill necessary to join the members is minimal. Also of importance is the fact that the coupling assembly comprises a minimum of parts which may be economically manufactured.

The coupling assembly of this invention comprises a tubular female member or socket into which a tubular male member is inserted. A seal between these members is effected by an O-ring carried in an external annular groove on the male member. When the members are fully engaged, the O-ring is in sealing contact with an internal cylindrical surface of the female member and the external annular groove of the male member. The male member is axially restrained from disengagement from the female member by an elliptical snapring secured to the entrance end of the female member. The elliptical snapring is proportioned to allow entrance of the male member and O-ring positioned thereon into the female member. The outside diameter of the male member is enlarged to provide an external annular shoulder, formed by a second groove on the male member, which is too large to pass freely through the elliptical retaining ring. A cross-sectional transition zone between the annular O-ring groove and annular shoulder forces the elliptical spring open when the male member is inserted until the retaining shoulder passes through the ring. The retaining ring then snaps back or contracts to its original position, and locks the male member to the female member. The elliptical spring is positioned in an internal annular recess formed in the entrance face or end of the female member to radially align it with the axis of the female member. The elliptical spring is retained in this internal groove by means of an apertured shell or cover threaded onto the outside diameter of the female member. The shell, elliptical retaining spring, and female member are preassembled before the coupling is used in the field.

The internal bore of the female member includes a transition zone which guides the entering male member and O-ring into the cylindrical bore wherein the O-ring seals the coupling members. When it is necessary to disconnect the members, the retaining shell may be unscrewed from the female member. In this case, ordinary tools may be employed to disconnect the coupling. The individual parts of the coupling assembly are proportioned to ensure that when the shell is backed off the female member enough to permit the O-ring to disengage the cylindrical sealing surface, the shell will still be in threaded engagement with the female member. As a result, any trapped pressure within the system may be safely vented before the coupling members are completely separated.

Further features and advantages of this invention will appear from the following description and drawings of the preferred embodiments, wherein:

FIG. 1 is a longitudinal, cross-sectional view of a coupling incorporating the present invention.

FIG. 2 is a cross-sectional view taken on line 2-2 of FIG. 1, showing the elliptical spring retainer and its relationship with the female and male members; and FIG. 3 is a fragmentary cross-sectional view of a second embodiment of this invention showing an additional retaining washer member.

DESCRIPTION OF THE PREFERRED EMBODIMENT

FIG. 1 shows the coupling assembly of this invention, including a female tubular member 11 in engagement with a tubular male member 12. As seen, the female member 11 and male member 12 are sealed by a resilient O-ring 13 carried in an annular groove 14 of the male member 12 and contacting an internal cylindrical surface 16 of the female member 11.

The female member 11 is provided with a suitable structure for connection to a hydraulic line (not shown). Where the hydraulic line is a pipe or tube, the member 11 has a bore 17 to receive the pipe or tube which is then secured by soldering, brazing or welding or the like. Insertion of a hydraulic line into the bore 17 is facilitated by a countersunk surface 18 provided at an end 19 of the female member 11. The bore 17 terminates at its inner end at a conical surface 21 which in turn joins the fluid passage bore 22 of the female member 11. It is understood that other arrangements for connecting the member 11 to a hydraulic line may be used since this structure forms no part of the present invention except as described hereinafter.

In like manner, the outside end 23 of the tubular male member 12 likewise has a countersunk surface 24 leading into a bore 26, which in turn leads to another conical surface 27. Similarly to the female member 11, a tube may be inserted into the bore 26 of the male member 12 and secured by soldering, brazing, welding or the like. The male member 12 provides a passage 28 which communicates with a conical zone 29 of the female member 11 which leads to the fluid passage 22 of the female member.

An internal annular recess 31 is provided at the entrance end 30 of the female member 11. An elliptical spring member 32 is normally positioned in this recess 31. The major axis of the elliptical spring 32 and the diameter of the internal recess 31 are so proportioned to allow the elliptical spring 32 to be readily inserted into the internal recess. As shown most clearly in FIG. 2, the elliptical spring member is preferably split at one end 35 to facilitate insertion of the male member 12.

The lead end 33 of the male member 12 is provided with a chamfer or bevel 34 around its periphery. The chamfer 34 allows the male member 12 to be slipped through the elliptical spring 32 more readily. The inside radial dimension of the minor axis of the elliptical spring 32 is sufficient to allow the O-ring 13 as it is carried on the male member 13 to pass through the elliptical spring 32. The outer diameter of the lead end of the male member 12 is uniform for both cylindrical surfaces 36 and 37 on both sides of the O-ring groove 14. The cylindrical surface 37 terminates at a conical transition zone 38. The transition zone 38 extends axially and radially to a second or major outer diameter of the male member with a cylindrical surface 39 which is interrupted by an external annular detent or groove 41. When the male member 12 and female member 11 are fully engaged, the internal recess 31 of the female member and the external annular groove 41 of the male member are axially aligned. The conical cross section 38 of the male member is provided to expand the elliptical spring by a camming action as the male member 13 is inserted into the female member 11. When the male and female members 12 and 11 are fully engaged, the elliptical spring 32 may snap or contract into the annular detent or groove 41 of the male member, locking the members together.

An internal, conical transition zone 42 of the female member 11 guides the male member into radial alignment and is helpful in properly compressing the O-ring 13 into sealing contact with the internal cylindrical surface 16. Only a slight amount of clearance is provided between the external cylindrical surfaces 36 and 37 of the male member and the internal cylindrical surface 16 of the female member. Likewise, minimum clearance is provided between the external cylindrical surface 39 of the male member and an internal cylindrical surface 43 of the female member. The elliptical spring 32 also engages the external annular groove 41 of the male member in a close radial fit. The relatively close fit between the external cylindrical surfaces of the male member and the internal cylindrical surfaces of the female member, along with the close radial fit of the retaining spring ensures that the coupling assembly 10 will provide a sealed joint with a relatively long service life.

The elliptical spring 32 is retained in the internal annular recess 31 by a shell 44 which is threaded onto the outside surface 46 of the female member 11. A clearance hole 47 is provided in the shell 44 to permit passage of the male member 12. A shoulder 49 on the shell 44 closes off the outer side of the recess 31 to retain the ring 32 in place. The axial length of the internal recess 31 provides sufficient clearance for the elliptical spring 32 to freely expand and contract radially. The female member 11, elliptical spring 32, and shell 44 are preassembled prior to the time of connection between the male member 12 and female member 11.

Thus, in an installation employing the coupling assembly of the present invention, no tools are required to make a connection. Only two units, the female member 11 carrying the shell 44 and spring 32 on one side, and the male member 12 carrying the O-ring 13 on the other need be handled. The male member 12 is simply inserted into the female member 11. The members 11 and 12 are radially self-aligning and no angular alignment is necessary. Thus, the coupling assembly 10 minimizes the amount of skill required to make a connection; no judgment of tightening forces is required such as would be necessary if the coupling members were threaded together. The risk of an improperly connected coupling is thereby minimized.

The coupling assembly 10 may be disconnected by engaging the outer surface 48 of the retaining shell 44 with an ordinary tool such as a wrench or pliers and unscrewing it from the female member 11. As shown in FIG. 1, the shell 44 is threaded onto the female member 11 for a distance somewhat greater than the axial distance from where the O-ring 13 seals the cylindrical surface 16 and the point where it is unsealed by reason of the change in internal cross section provided by the internal conical surface 42. This permits any trapped fluid pressure to safely escape before the female member 11 and the male member 12 are fully disconnected. The members may be fully disconnected, of course, by completing the unthreading of the shell 44 from the female member 11.

As mentioned above, the male member 12 is retained in the female member 11 by means of the elliptical spring 32, which seats in the external annular groove 41 of the male member. Axial fluid pressure, tending to disconnect the coupling, is withstood by the side or shoulder 50 of the groove 41 which abuttingly engages the elliptical spring 32. The opposing side or shoulder 51 of the groove 41 is provided to prevent relative axial movement of the male and female members 12 and 11 in the direction of engagement once the elliptical spring 32 has engaged the groove 41. In applications where it is not necessary to make such a provision against axial movement the portion of the male member 12 which provides the opposing side 51 may be omitted.

In the arrangement of FIGS. 1 and 2, the axial force tending to separate the coupling is taken up by the shoulder 49 only at the points where it engages the major axis ends 53 of the retaining spring 32. If the material of the cap or shell 44 is relatively thin, this support may not be sufficient, particularly in the case of high pressure or large size. Therefore, it may be necessary to provide an additional reinforcement for the shoulder 49 as shown in FIG. 3. As shown, an additional retaining washer 52 is provided in addition to the parts of the assembly 10 shown in FIG. 1. The reference numerals used to identify the assembly parts and areas thereof in the embodiment of FIG. 1 have been similarly used in the embodiment of FIG. 3 wherever possible. The retaining washer 52 is provided to distribute the axial separating forces within the assembly more evenly to the shoulder of the retaining shell 44. The retaining washer 52 reduces the concentration of axial forces transmitted to the shell from the major ends 53 (shown in FIG. 2) of the elliptical ring 32. It can be seen from FIG. 3 that the male member 12 has been axially extended to provide a cylindrical surface 54 on which the retaining washer 52 may rest. Similarly, the retaining shell 44 has been axially extended to accommodate the thickness of the washer 52 and assure that the shell will still be engaged with the female member 11 when the coupling has been unsealed. Of course, the retaining washer 52 may be preassembled within the shell 44 before the coupling assembly 10 is used.

We claim:

1. A coupling assembly comprising a female tubular member and a male tubular member shaped to enter and engage said female member, said male member having a first annular groove adjacent one end and a second annular groove including opposed shoulders displaced from said end, a resilient sealing ring being carried in said first annular groove, said female member having an entrance end and an internal cylindrical surface in axial alignment with said first groove when said members are fully engaged, a self-contracting element adjacent said entrance end, said self-contracting element being proportioned to allow insertion of said male member carrying said sealing ring into said female member and to lockingly engage said shoulders when said members are fully engaged, threaded means to secure said self-contracting element to said female member, said female member being axially threaded to mate with said threaded means, said internal cylindrical surface terminating at a point axially displaced from the entrance end of said female member, said ring being in sealing contact with said cylindrical surface and said first groove when said members are fully engaged, at least one revolution of thread of said threaded means being threaded to said female member for an axial distance corresponding to the axial distance between a point where said ring seals said cylindrical surface and said first groove when said members are fully engaged and said point where said internal cylindrical surface terminates.

2. A coupling assembly comprising a female tubular member and a male tubular member shaped to enter and engage said female member, said male member having a first outer annular groove adjacent one end and a second outer annular groove displaced from said end, a transition zone between said first and second grooves, said female member having an internal cylindrical surface in axial alignment with said first groove when said members are fully engaged, an elliptical spring element at the entrance end of said female member, said elliptical spring element being in axial alignment with said second groove when said members are fully engaged, said female member having an inner conical transition zone between said entrance end and said inner cylindrical surface, a resilient sealing ring being carried in said first annular groove and in sealing engagement with said cylindrical surface when said members are fully engaged, said spring element being proportioned to allow insertion of said male member carrying said sealing ring into said female member and to snap into locking engagement with said second annular groove when said members are fully engaged to prevent substantial axial movement between said members in either direction, said transition zone expanding said elliptical spring element upon insertion of said male member into said female member, threaded means to secure said spring element to said female member, said threaded means being threaded onto the outer surface of said female member, said members and said threaded means being proportioned to permit said sealing ring to disengage said cylindrical surface before said threaded means is fully unthreaded from said female member.

3. A coupling assembly as set forth in claim 2 wherein an annular recess in the entrance end of said female member is provided to radially align said elliptical spring element and a retaining washer is provided between said elliptical spring element and said threaded means to axially restrain said spring element in said annular recess, said washer extending radially inward from and abutting the major ends of said elliptical spring when said members are fully engaged.

4. A quick connect coupling comprising a female tubular member and male tubular member shaped to enter and engage the female member, said male member having a first outer cylindrical surface adjacent to one end, said female member having an internal cylindrical surface axially displaced from its entrance end, one of said members providing an annular groove adjacent the cylindrical surface of such member, a resilient sealing ring carried in said annular groove and in sealing contact with the cylindrical surface of the other of said members and said groove when said members are fully engaged, said male member having a second outer cylindrical surface spaced axially from said one end and of larger diameter than said first surface, and an external annular detent groove having opposing sides adjacent said second surface, a radially movable resilient detent element adjacent said entrance end of said female member, a cam surface on said male member between said first and second surfaces which forces said detent element to move radially outward when said male member is inserted into said female member, retaining means releasably secured to said female member and defining with said female member an internal annular recess retaining said detent element against substantial axial movement and permitting radial movement, said detent element self-contracting radially inward to lockingly engage said detent groove and its opposing sides to prevent substantial relative axial movement in either direction between said members after full engagement of such members, separation of said retaining means from said female member permitting disengagement of said male member from said female member while said detent element remains in engagement with said detent groove of said male member.

5. A quick connect coupling as set forth in claim 4 wherein said detent element comprises an elliptical spring member in parallel alignment with a plane perpendicular to the axis of said female member.

6. A quick connect coupling as set forth in claim 5 wherein said retaining means comprises an apertured shell threaded to said female member which retains said spring member in said annular recess.

7. A quick connect coupling as set forth in claim 4 wherein said male member provides said annular groove and carries said resilient sealing ring.